Figure 1:
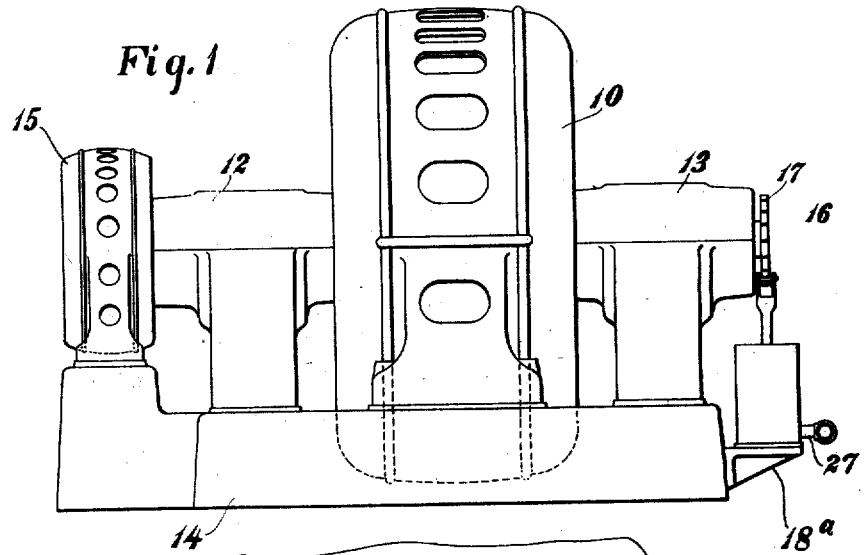

W. D. POMEROY.
MEANS FOR STARTING DYNAMO ELECTRIC MACHINES.
APPLICATION FILED MAY 17, 1906.

909,216.

Patented Jan. 12, 1909.

WITNESSES
Oliver W. Harman
Fred J. Kinsey

INVENTOR
William D. Pomeroy
By
Chas. E. Lord
ATTORNEY

UNITED STATES PATENT OFFICE.

WILLIAM D. POMEROY, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

MEANS FOR STARTING DYNAMO-ELECTRIC MACHINES.

No. 909,216.     Specification of Letters Patent.     Patented Jan. 12, 1909.

Application filed May 17, 1906. Serial No. 317,282.

*To all whom it may concern:*

Be it known that I, WILLIAM D. POMEROY, a citizen of the United States, residing at Norwood, in the county of Hamilton and State of Ohio, have invented certain new and useful Improvements in Means for Starting Dynamo-Electric Machines, of which the following is a full, clear, and exact specification.

My invention relates to dynamo-electric machines and particularly to those which are not self starting, such as synchronous motors and other machines which run as synchronous motors including rotary converters, frequency-changers and other motor-generator sets. Such machines above referred to are usually started and brought up to synchronism by an auxiliary motor, generally an induction motor, mounted on the main shaft. If the main machine to be started is heavy, a very large starting motor is necessary not only on account of the inertia of the rotor of the main machine, but principally for the reason that the lubricant by the great weight of the rotor, is squeezed from beneath the shaft while at rest, leaving the shaft resting on the dry bearings resulting in a high coefficient of friction. A much larger auxiliary motor is necessary therefore to initially start the rotor of the main machine than would be necessary to bring the machine up to synchronous speed after being started. Since the auxiliary or starting motor is employed only for starting purposes and is at all other times idle, it is evident that a large starting motor is very undesirable.

The object of my invention is to provide means whereby a much smaller auxiliary motor can be employed for bringing large synchronous dynamo-electric machines up to synchronism than could heretofore be employed.

In carrying out my invention, I provide means for starting the dynamo-electric machine from rest and provide an auxiliary dynamo-electric machine such as a non-synchronous motor for bringing the main dynamo-electric machine up to speed after it has been moved from rest.

More specifically considered, my invention consists in the combination of a synchronous dynamo-electric machine mounted on a shaft, a toothed or notched wheel on the shaft, and means comprising a piston and rod adapted to be actuated by fluid pressure, such as water, air or oil, for moving the machine from rest and thus overcome static friction, and a non-synchronous motor also mounted on the shaft for bringing the machine up to synchronism.

My invention still further consists in the details of construction and combinations of elements described in the specification and set forth in the appended claims.

For a better understanding of my invention, reference is had to the accompanying drawings in which—

Figure 2:
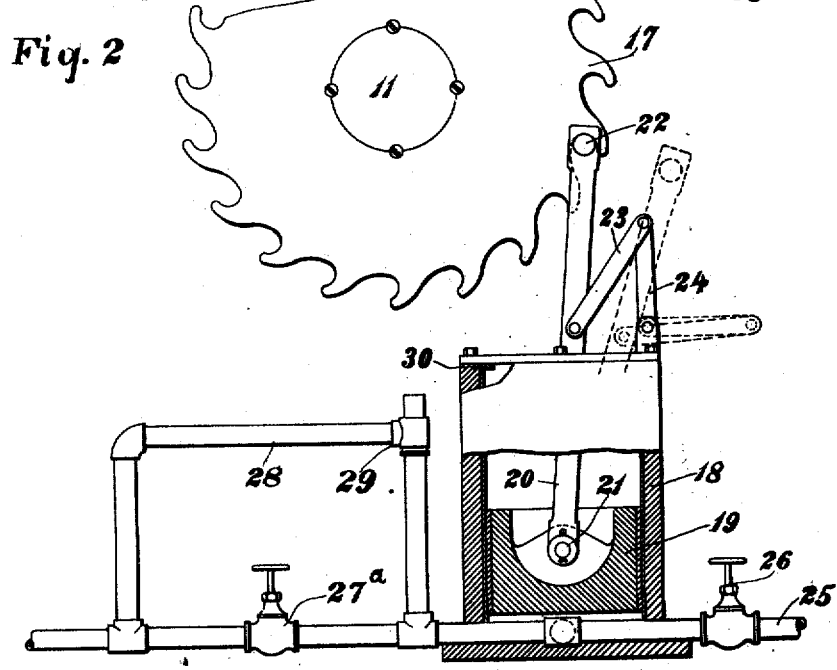

Figure 1 is a view in elevation of a dynamo-electric machine and the means for starting and bringing the machine up to synchronous speed; and Fig. 2 is a view, with parts broken away and in section, of the means for starting the dynamo-electric machine from rest.

Referring now to the figures of the drawing, I have shown in elevation at 10, a dynamo-electric machine which is intended to represent any machine not self starting as machines of the synchronous type, such as synchronous motors, rotary converters, frequency changers, or other motor generator sets, the rotor of which (not shown) is mounted on the shaft 11 which is provided with main bearings 12 and 13. The frame of the machine and the shaft bearings are supported on the base 14. Mounted on one end of the shaft is the rotor of an auxiliary non-synchronous motor 15, preferably an induction motor. The frame and stator of the induction motor are supported on an extension of the base 14.

As was stated above the static friction of a large synchronous machine is very great and if the motor 15 is relied upon for bringing the machine up to synchronism, a very large motor must be employed. In order that a small motor may be employed I provide means in addition to the motor for overcoming the static friction of the machine or for starting the latter from rest. The starting means consists, in this case, of a fluid actuated means such as a hydraulic or pneumatic jack, the movable piston rod of which is adapted to engage a toothed or notched wheel 17 on the shaft. The jack consists essentially of a cylinder 18, piston 19 and piston rod 20 pivoted thereto at 21, the piston rod having a wrist pin 22 adapted to engage the toothed wheel 17. The cylinder 18 is supported on a bracket 18ᵃ on the base 14 and is preferably located below the toothed wheel in such a manner that the center of gravity of the piston rod always falls outside of its pivotal center 21. A pair of links pivoted to each other and to the piston rod 20 and cylinder 18, are shown at 23 and 24 respectively, said links serving to automatically lock the piston rod in an inoperative position as will be explained later. The supply pipe shown at 25 is provided with a main valve 26 and is connected by a nipple 27 to the cylinder 18. At 27ᵃ is shown an exhaust valve and at 28 an over-flow pipe with a relief valve 29 adapted to be opened only when the piston 19 has been moved by the fluid pressure to the end of the stroke.

The operation of the starting means will now be explained more fully. When it is desired to start the machine 10 the operator by hand lifts the links 23 and 24 so that the piston rod can be swung about the point 21 into engagement with the toothed wheel 17. The main valve is then opened and the pressure of the fluid in the cylinder raises the piston and rod, and the latter after engaging a tooth of the wheel 17 turns the shaft and rotor of the main machine. After the shaft has been moved from rest the torque of the motor 15 is sufficient to continue the rotation of the machine and to accelerate its speed up to synchronism. Unless the fluid supply is shut off the piston continues its upward movement until it engages a stop 30 and after reaching the end of the stroke the piston rod is thrown away from the wheel by the tooth below or following the tooth which was engaged by the wrist pin 22. If the fluid supply is not shut off at the main valve 26 after the piston engages the stop 30, the fluid pressure then becomes sufficient to open the relief valve 29, and an overflow occurs through the bridging pipe 28. After closing the valve 26, the operator opens the exhaust valve 27 and the piston falls to the position shown in Fig. 1. The weight of the piston rod causes the latter to fall to the position shown in dotted lines in Fig. 2 and the links 23 and 24 also assume the position shown in dotted lines, automatically locking the piston rod in its inoperative position. The particular starting jack and system of piping is especially adapted to be operated by hydraulic pressure, but it is evident that the jack can be operated by pneumatic pressure if desired.

I do not wish to be confined to the exact details shown as many changes and modifications can be made without departing from the spirit and scope of my invention, and I aim in my claims to cover all such modifications.

What I claim as new and desire to secure by Letters Patent is:—

1. In combination, a main dynamo-electric machine, means for starting said machine from rest, and an auxiliary dynamo-electric machine for bringing said main dynamo-electric machine up to a predetermined speed.

2. In combination, a synchronous dynamo-electric machine, means actuated by fluid pressure for starting said machine, and an electric motor for bringing said machine up to synchronism.

3. In combination, a dynamo-electric machine, means for overcoming the static friction of said machine, and a motor for accelerating the speed of said machine.

4. In combination, a dynamo-electric machine comprising a synchronous motor, means actuated by fluid pressure for overcoming the static friction of the machine, and an auxiliary motor for bringing the dynamo-electric machine up to synchronous speed.

5. In combination, a synchronous dynamo-electric machine, a shaft therefor, a toothed or notched wheel on said shaft, means actuated by fluid pressure for engaging said wheel to move the machine from rest, and an electric motor for accelerating the speed of the said machine.

6. In combination, a synchronous dynamo-electric machine, a shaft therefor, a toothed or notched wheel on said shaft, a fluid actuated piston and piston rod in proximity to said wheel, whereby said rod can engage said wheel to start the machine from rest, and a non-synchronous motor for bringing the machine up to synchronous speed.

7. In combination, a synchronous dynamo-electric machine, a shaft therefor, a toothed or notched wheel on said shaft, fluid actuated means comprising a piston rod adjacent said wheel adapted to engage the latter, and on being actuated, to start the dynamo-electric machine from rest, and a non-synchronous motor adapted to accelerate the speed of the dynamo-electric machine.

8. In combination, a synchronous dynamo-electric machine, a shaft on which said machine is mounted, a toothed or notched wheel on said shaft, a piston below said wheel, a piston rod adapted to engage a tooth of said wheel and to be moved upwardly under fluid pressure to start said machine, and a motor for bringing the latter up to synchronous speed.

9. In combination, a synchronous dynamo-electric machine, a shaft on which said machine is mounted, a toothed or notched wheel on said shaft, a piston adjacent said wheel, a piston rod pivoted to said piston, said rod being adapted to engage and move the wheel and after a predetermined movement under fluid pressure to automatically move out of engagement with said wheel, and an auxiliary non-synchronous motor also on said shaft.

10. In combination, a synchronous dynamo-electric machine, a shaft on which said machine is mounted, a toothed or notched wheel on said shaft, a cylinder and a piston beneath said wheel, a piston rod pivoted to said piston and adapted to engage the wheel and to be moved upward under fluid pressure to start the machine, and at the end of the stroke of the piston to be moved out of engagement with the wheel, and a non-synchronous motor on the shaft.

11. In combination, a synchronous dynamo-electric machine, a shaft on which said machine is mounted, means comprising a fluid actuated piston and rod, adapted to start the machine from rest, means for locking the rod in an inoperative position, and a non-synchronous motor also mounted on said shaft.

12. In combination, a motor, means for overcoming the static friction of said motor, and separate means for accelerating the speed of said motor.

13. In combination, a synchronous dynamo-electric machine, a shaft on which said machine is mounted, a toothed or notched wheel on said shaft, means comprising a fluid actuated piston and a rod pivoted thereto for starting said machine from rest, said rod being adapted to be moved into engagement with said wheel and when actuated by fluid pressure to move the machine through a portion of a revolution, and at the end of a stroke to move out of engagement with said wheel, means for locking the rod in an inoperative position, and a non-synchronous motor on the shaft.

In testimony whereof I affix my signature, in the presence of two witnesses.

WILLIAM D. POMEROY

Witnesses:
 ARTHUR F. KWIS,
 FRED J. KINSEY.